United States Patent
Jheng et al.

(10) Patent No.: US 8,143,799 B2
(45) Date of Patent: Mar. 27, 2012

(54) LIGHT EMITTING DIODE DRIVING CIRCUIT

(75) Inventors: Ruei-Jhih Jheng, Hsin-Chu (TW); Chia-Liang Tai, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 285 days.

(21) Appl. No.: 12/609,119

(22) Filed: Oct. 30, 2009

(65) Prior Publication Data
US 2011/0101876 A1    May 5, 2011

(30) Foreign Application Priority Data
Nov. 13, 2008    (TW) ................. 97143814 A

(51) Int. Cl.
*H05B 37/02* (2006.01)
(52) U.S. Cl. ......... 315/246; 315/254; 315/276; 315/291
(58) Field of Classification Search ............. 315/246, 315/250, 254, 276, 283, 291, 299, 307
See application file for complete search history.

(56) References Cited

U.S. PATENT DOCUMENTS

| | | | | |
|---|---|---|---|---|
| 5,675,485 A * | 10/1997 | Seong | ............................. | 363/97 |
| 6,597,589 B2 * | 7/2003 | Wang | ......................... | 363/21.18 |
| 7,262,559 B2 * | 8/2007 | Tripathi et al. | ............... | 315/291 |
| 7,781,982 B2 * | 8/2010 | Tatsumi | ........................ | 315/291 |
| 7,852,649 B2 * | 12/2010 | Hsiao | .............................. | 363/97 |
| 7,906,917 B2 * | 3/2011 | Tripathi et al. | ............... | 315/291 |

* cited by examiner

*Primary Examiner* — Thuy Vinh Tran
(74) *Attorney, Agent, or Firm* — Chun-Ming Shih

(57) ABSTRACT

A LED driving circuit includes a transformer, a rectifying filtering circuit, a PWM IC, a constant current circuit, and a feedback circuit. The transformer has a primary side and a secondary side. The rectifying filtering circuit is coupled to the secondary side and has a first output terminal. The PWM IC is coupled to the primary side. The constant current circuit has a second output terminal. A LED load is adapted to couple between the first output terminal and the second output terminal. The feedback circuit has a first input terminal coupled to the first output terminal to receive a first voltage and a second input terminal coupled to the constant current circuit to receive a second voltage. The second voltage varies with a conduction status of the LED load. The feedback circuit is adapted to control the PWM IC according to the received first and second voltages.

9 Claims, 7 Drawing Sheets

LIGHT EMITTING DIODE DRIVING CIRCUIT

CROSS-REFERENCE TO RELATED APPLICATIONS

This application is based upon and claims the benefit of priority from the prior Taiwanese Patent Application No. 097143814, filed Nov. 13, 2008, the entire contents of which are incorporated herein by reference.

BACKGROUND

1. Field of the Invention

The present invention generally relates to a driving circuit and, more particularly to a light emitting diode (LED) driving circuit.

2. Description of the Related Art

Referring to FIG. 7, a conventional LED driving circuit 70 is adapted to drive a LED load 300. The LED driving circuit 70 includes a transformer T1, a rectifying filtering circuit 72, a pulse width modulation integrated circuit (PWM IC) 74, a feedback circuit 76, and a constant current circuit 78. The transformer T1 has a primary side and a secondary side. The rectifying filtering circuit 72 is electrically coupled to the secondary side of the transformer T1 and used to rectify and filter alternating current (AC) power outputted from the secondary side of the transformer T1 and output a direct current (DC) voltage from an output terminal thereof. The PWM IC 74 is electrically coupled to the primary side of the transformer T1. The feedback circuit 76 has an inverting input terminal and a non-inverting input terminal. The inverting input terminal is electrically coupled to the rectifying filtering circuit 72 to receive the DC voltage. The non-inverting input terminal receives a constant reference voltage Vref1. The feedback circuit 76 controls the PWM IC 74 according to both the DC voltage and the reference voltage Vref1 respectively received by the inverting input terminal and the non-inverting input terminal thereof. The LED load 300 is electrically coupled between the output terminal of the rectifying filtering circuit 72 and an output terminal of the constant current circuit 78. The constant current circuit 78 includes a three-terminal regulator U2, a field effect transistor Q1, and resistors Ra, Rb. An output terminal of the three-terminal regulator U2 receives a DC voltage VCC through the pull-up resistor Rb. A gate terminal of the field effect transistor Q1 is electrically coupled to the output terminal of the three-terminal regulator U2, a drain terminal thereof is electrically coupled to an input terminal of the three-terminal regulator U2, and a source terminal thereof is used as the output terminal of the constant current circuit 78. The resistor Ra is electrically coupled between a ground terminal and the input terminal of the three-terminal regulator U2.

Furthermore, when there is a need to perform an external PWM dimming applied to the LED load 300, a dimming circuit 79 is electrically coupled to the ground terminal of the three-terminal regulator U2 of the constant current circuit 78. The dimming circuit 79 includes an operational amplifier U1 and a field effect transistor Q3. An inverting input terminal and a non-inverting input terminal of the operational amplifier U1 respectively receive a pulse width modulation signal PWM and a reference voltage Vref2. An output terminal of the operational amplifier U1 is electrically coupled to a gate terminal of the field effect transistor Q3. The field effect transistor Q3 is electrically coupled between the ground terminal of the three-terminal regulator U2 and a ground potential.

However, the LED driving circuit 70 utilizes the three-terminal regulator U2, the field effect transistor Q1, and the resistor Ra to produce a constant current output, and the outputted DC voltage is constant rather than varied with the LED load 300, so that a relatively large power loss occurs on the field effect transistor Q1. In addition, an additional field effect transistor Q3 is needed to perform the external PWM dimming.

BRIEF SUMMARY

The present invention is directed to provide a LED driving circuit capable of reducing a power loss.

Other advantages and objects of the present invention can be further comprehended through the technical features disclosed in the present invention.

In order to achieve one or part of or all the objectives or other objectives, a LED driving circuit in accordance with an exemplary embodiment of the present invention is provided. The LED driving circuit is adapted to drive a LED load. The LED driving circuit includes a transformer, a rectifying filtering circuit, a pulse width modulation integrated circuit, a constant current circuit, and a feedback circuit. The transformer has a primary side and a secondary side. The rectifying filtering circuit is electrically coupled to the secondary side and has a first output terminal. The pulse width modulation integrated circuit is electrically coupled to the primary side. The constant current circuit has a second output terminal. The LED load is adapted to be electrically coupled between the first output terminal and the second output terminal. The feedback circuit has a first input terminal and a second input terminal. The first input terminal is electrically coupled to the first output terminal to receive a first voltage. The second input terminal is electrically coupled to the constant current circuit to receive a second voltage. The second voltage is capable of varying with a conduction status of the LED load. The feedback circuit is adapted to control the pulse width modulation integrated circuit according to the first voltage and the second voltage.

In one embodiment, the constant current circuit includes a three-terminal regulator, a diode, a field effect transistor, a first resistor, a second resistor, a third resistor, and a fourth resistor. A ground terminal of the three-terminal regulator is grounded, an input terminal of the three-terminal regulator is electrically coupled to the ground terminal through the fourth resistor, and an output terminal of the three-terminal regulator is adapted to receive a third voltage through the second resistor. An anode of the diode is electrically coupled to the second input terminal and adapted to receive a fourth voltage through the first resistor, and a cathode of the diode is electrically coupled to the output terminal of the three-terminal regulator through the third resistor. The field effect transistor is electrically coupled between the input terminal of the three-terminal regulator and the second output terminal, and a gate terminal of the field effect transistor is electrically coupled to the output terminal of the three-terminal regulator.

In one embodiment, the third voltage and the fourth voltage are equal to each other.

In one embodiment, the third voltage is outputted by an operational amplifier. The operational amplifier has a third input terminal and a fourth input terminal, the third input terminal is adapted to receive a reference voltage, and the fourth input terminal is adapted to receive a pulse width modulation signal.

Alternatively, in one embodiment, the constant current circuit includes a three-terminal regulator, a diode, a field effect transistor, a first resistor, a second resistor, a third resistor, and a fourth resistor. A ground terminal of the three-terminal regulator is grounded, an input terminal of the three-terminal regulator is electrically coupled to the ground terminal through the fourth resistor, and an output terminal of the three-terminal regulator is adapted to receive a third voltage through the first resistor and the second resistor connected in series. A cathode of the diode is electrically coupled to the second input terminal, and an anode of the diode is electrically coupled to a node formed between the first resistor and the second resistor through the third resistor. The field effect transistor is electrically coupled between the input terminal of the three-terminal regulator and the second output terminal, and a gate terminal of the field effect transistor is electrically coupled to the output terminal of the three-terminal regulator. Furthermore, the third voltage is outputted by an operational amplifier. In particular, the operational amplifier has a third input terminal and a fourth input terminal, the third input terminal is adapted to receive a reference voltage, and the fourth input terminal is adapted to receive a pulse width modulation signal.

In order to achieve one or part of or all the objectives or other objectives, another LED driving circuit in accordance with an exemplary embodiment of the present invention is provided. The LED driving circuit is adapted to drive a plurality of LED loads connected in parallel. The LED driving circuit includes a transformer, a rectifying filtering circuit, a pulse width modulation integrated circuit, a plurality of constant current circuits, and a feedback circuit. The transformer has a primary side and a secondary side. The rectifying filtering circuit is electrically coupled to the secondary side and has a first output terminal. The pulse width modulation integrated circuit is electrically coupled to the primary side. Each of the constant current circuits has a second output terminal. The LED loads are respectively adapted to be electrically coupled between the first output terminal and the second output terminals. The feedback circuit has a first input terminal and a second input terminal. The first input terminal is electrically coupled to the first output terminal to receive a first voltage, and the second input terminal is electrically coupled to the constant current circuits to receive a second voltage provided by a particular constant current circuit of the constant current circuits. The second voltage is capable of varying with a conduction status of the LED load electrically coupled to the particular constant current circuit. The feedback circuit is adapted to control the pulse width modulation integrated circuit according to the first voltage and the second voltage.

In one embodiment, each of the constant current circuits includes a three-terminal regulator, a diode, a field effect transistor, a first resistor, a second resistor, a third resistor, and a fourth resistor. A ground terminal of the three-terminal regulator is grounded, an input terminal of the three-terminal regulator is electrically coupled to the ground terminal through the fourth resistor, and an output terminal of the three-terminal regulator is adapted to receive a third voltage through the first resistor and the second resistor connected in series. A cathode of the diode is electrically coupled to the second input terminal, and an anode of the diode is electrically coupled to a node formed between the first resistor and the second resistor through the third resistor. The field effect transistor is electrically coupled between the input terminal of the three-terminal regulator and the second output terminal, and a gate terminal of the field effect transistor is electrically coupled to the output terminal of the three-terminal regulator. Furthermore, the third voltage is outputted by an operational amplifier. In particular, the operational amplifier has a third input terminal and a fourth input terminal, the third input terminal is adapted to receive a reference voltage, and the fourth input terminal is adapted to receive a pulse width modulation signal.

In various embodiments of the present invention, the constant current circuit(s) is/are electrically coupled to the second input terminal of the feedback circuit, so as to supply a reference voltage varied with the conduction status of the LED load to the second input terminal. Therefore, a single constant current output or multiple constant current outputs may be realized and the output voltage of the rectifying filtering circuit coupled to the secondary side of the transformer varies with the LED load, the power loss is reduced as a result. Furthermore, when there is a need to perform an external PWM dimming applied to the LED load, no additional field effect transistor is needed as required in the prior art, therefore the cost is also reduced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
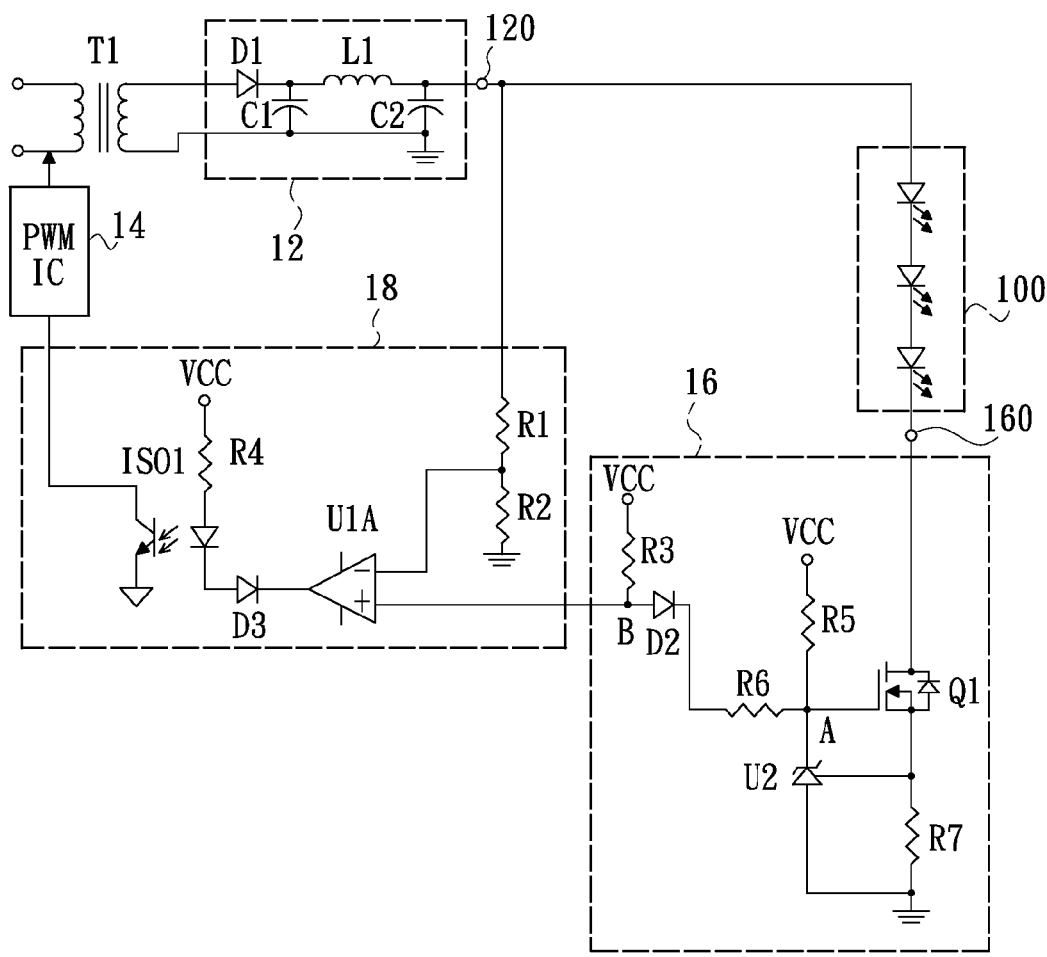
FIG. 1 is a schematic circuit diagram of a LED driving circuit in accordance with a first exemplary embodiment of the present invention.

Referring to FIG. 1, a LED driving circuit 10 in accordance with a first exemplary embodiment of the present invention is adapted to drive a LED load 100. The LED driving circuit 10 includes a transformer T1, a rectifying filtering circuit 12, a pulse width modulation integrated circuit (PWM IC) 14, a constant current circuit 16, and a feedback circuit 18.

The transformer T1 includes a primary side and a secondary side. The rectifying filtering circuit 12 is electrically coupled to the secondary side of the transformer T1 and used to rectify and filter an alternating current (AC) power outputted from the secondary side and output a direct current (DC) voltage from an output terminal 120 thereof. In this exemplary embodiment, the rectifying filtering circuit 12 is consisted of a rectifier diode D1, an inductor L1, and capacitors C1, C2. The PWM IC 14 is electrically coupled to the primary side of the transformer T1.

The constant current circuit 16 includes a three-terminal regulator U2, a diode D2, a field effect transistor Q1, and resistors R3, R5, R6 and R7. A ground terminal of the three-terminal regulator U2 is grounded, an input terminal of the three-terminal regulator U2 is electrically coupled to the ground terminal through the resistor R7, and an output terminal of the three-terminal regulator U2 is adapted to receive a DC voltage VCC through the resistor R5. An anode of the diode D2 is adapted to receive the DC voltage VCC through the resistor R3, and a cathode of the diode D2 is electrically coupled to the output terminal of the three-terminal regulator U2 through the resistor R6. The field effect transistor Q1 is electrically coupled between an output terminal 160 of the constant current circuit 16 and the input terminal of the three-terminal regulator U2, and a gate terminal of the field effect transistor Q1 is electrically coupled to the output terminal of the three-terminal regulator U2. The node formed between the gate terminal of the field effect transistor Q1 and the output terminal of the three-terminal regulator U2 is defined as node A. The LED load 100 is adapted to be electrically coupled between the output terminal 120 of the rectifying filtering circuit 12 and the output terminal 160 of the constant current circuit 16.

The feedback circuit 18 includes two resistors R1 and R2 coupled in serial, an operational amplifier U1A, a diode D3, an optoelectronic coupler ISO1, and a pull-up resistor R4. The DC voltage outputted from the output terminal 120 of the rectifying filtering circuit 12 is voltage-divided by the resistors R1 and R2, and then is inputted into an inverting input terminal of the operational amplifier U1A. A non-inverting input terminal of the operational amplifier U1A is electrically coupled to the anode of the diode D2 of the constant current circuit 16. The node formed between the non-inverting input terminal of the operational amplifier U1A and the anode of the diode D2 is defined as node B. The diode D3 is electrically coupled between an output terminal of the operational amplifier U1A and the optoelectronic coupler ISO1. The optoelectronic coupler ISO1 receives the DC voltage VCC through the pull-up resistor R4 and is electrically coupled to the PWM IC 14. Herein, the feedback circuit 18 controls the PWM IC 14 according to signals received by the inverting input terminal and the non-inverting input terminal of the operational amplifier U1A.

An operational principle of the LED driving circuit 10 of the first exemplary embodiment will be described in detail as follows.

(1) In the initial boot stage, the voltage drop between the two terminals of the resistor R7 does not reach the threshold voltage (e.g., 1.25 volts) of the three-terminal regulator U2, the voltage at the node A is VCC. The voltage of the gate terminal of the field effect transistor Q1 is VCC and the field effect transistor Q1 keeps in on-state, and what is defined as stage one. In the stage one, based on the Kirchhoff's Voltage Law (KVL), no current flows through the diode D2 and the resistor R6, the voltage at the node B is VCC. Therefore, VCC is a maximum reference voltage of the operational amplifier U1A of the feedback circuit 18, and thus a maximum output voltage of the output terminal 120 of the rectifying filtering circuit 12 may be set based on the maximum reference voltage.

(2) When the voltage drop between the two terminals of the resistor R7 reaches the threshold voltage of the three-terminal regulator U2, the three-terminal regulator U2 turns on. The voltage at the node A is pulled down to a low potential, the gate terminal of the field effect transistor Q1 is in the low potential, the field effect transistor Q1 is in off-state, and what is defined as stage two. Once the field effect transistor Q1 turns off and the voltage drop between the two terminals of the resistor R7 does not reach the threshold voltage of the three-terminal regulator U2, the LED driving circuit 10 returns back to the stage one, and so repeatedly. Since the response speed of the three-terminal regulator U2 is fast enough, a steady voltage VDD (not shown in FIG. 1) (VDD<VCC) is formed at the node A, and the voltage drop between the two terminals of the resistor R7 keeps at the threshold voltage of the three-terminal regulator U2. As a result, the current flowing through the two terminals of the resistor R7 is a constant current.

(3) When the steady voltage VDD is formed at the node A, the reference voltage (i.e., the voltage at the node B) of the non-inverting input terminal of the operational amplifier U1A falls in between VCC and VDD. Therefore, the output voltage of the output terminal 120 of the rectifying filtering circuit 12 coupled to the secondary side of the transformer T1 is lower than the maximum output voltage thereof and is directly proportional to the amount of the LEDs of the LED load 100. In particular, the less the amount of the LEDs, the lower the value of the VDD as well as the output voltage. Accordingly, a single constant current output may be realized and the output voltage of the output terminal 120 of the rectifying filtering circuit 12 coupled to the secondary side of the transformer T1 varies with the LED load 100, the power loss is reduced as a result. In this exemplary embodiment, the voltage of the non-inverting input terminal of the operational amplifier U1A (i.e., the voltage at the node B) varies with the conduction status of the LED load 100.

Figure 2:
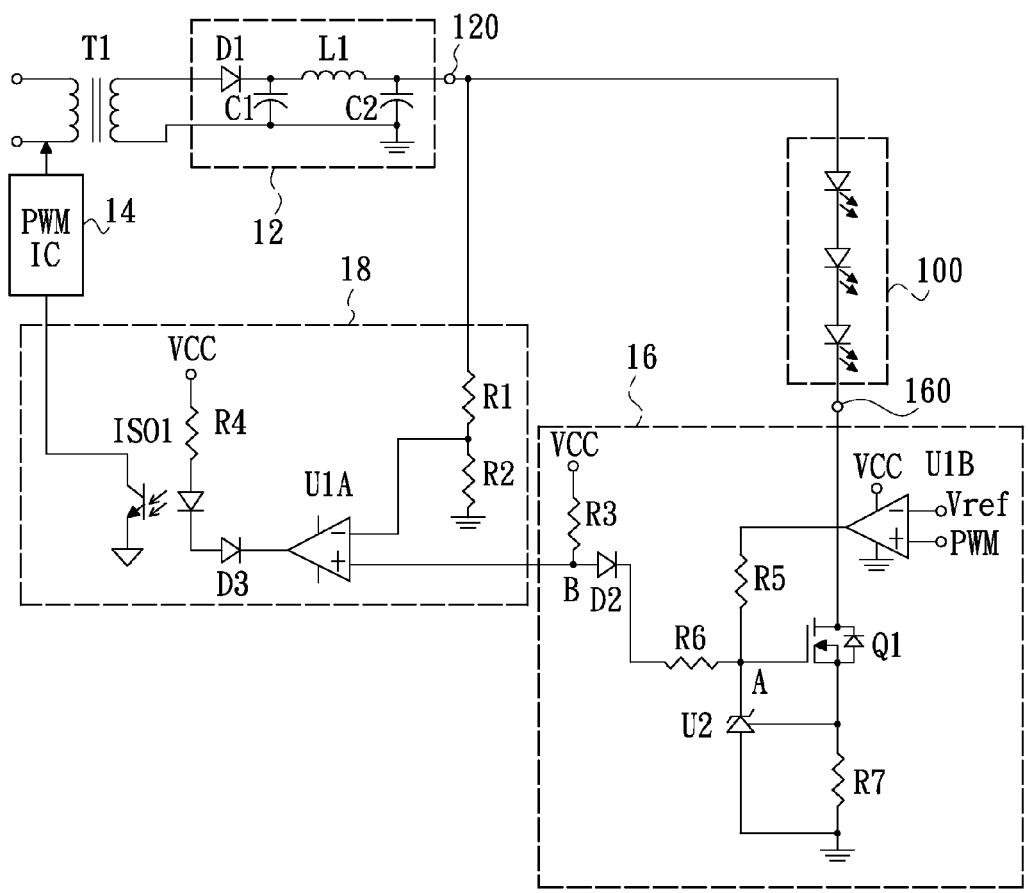
FIG. 2 is a schematic circuit diagram of a LED driving circuit in accordance with a second exemplary embodiment of the present invention.

Referring to FIG. 2, a LED driving circuit 20 in accordance with a second exemplary embodiment of the present invention is similar to the LED driving circuit 10 of the first exemplary embodiment, and the difference is that the LED driving circuit 20 further includes an operational amplifier U1B to perform an external PWM dimming for the LED load 100. Correspondingly, the output terminal of the three-terminal regulator U2 is electrically coupled to the operational amplifier U1B through the resistor R5, rather than directly receive the DC voltage VCC through the resistor R5 as shown in FIG. 1. More specifically, the power terminal of the operational amplifier U1B directly receives the DC voltage VCC, the ground terminal thereof is grounded, the inverting input terminal thereof receives the reference voltage Vref, the non-inverting input terminal thereof receives the pulse width modulation signal PWM, and an output terminal thereof is used to output a DC voltage to the output terminal of the three-terminal regulator U2 through the resistor R5.

An operational principle of the LED driving circuit 20 of the second exemplary embodiment of the present invention will be described in detail as follows.

(1) In the initial boot stage, when the pulse width modulation signal PWM is a low potential, the DC voltage outputted from the output terminal of the operational amplifier U1B is a low potential, the gate terminal of the field effect transistor Q1 is in the low potential. The field effect transistor Q1 is in off-state, the LED load 100 is in off-state correspondingly, and at this time the node A is in a low potential. Based on the KVL, there is a current flowing through the diode D2 and the resistor R6, the voltage at the node B is VEE (not shown in FIG. 2) (VEE<VCC), and what is defined as stage one. In the stage one, the output voltage of the output terminal 120 of the rectifying filtering circuit 12 coupled to the secondary side of the transformer T1 is lower than the maximum output voltage thereof.

(2) When the pulse width modulation signal PWM is a high potential and the voltage drop between the two terminals of the resistor R7 does not reach the threshold voltage of the three-terminal regulator U2, the three-terminal regulator U2 keeps in off-state. The DC voltage outputted from the output terminal of the operational amplifier U1B is a high potential VCC, the voltage at the node A also is VCC. That is, the gate terminal of the field effect transistor Q1 is in a high potential, the field effect transistor Q1 turns on, and what is defined as stage two. In the stage two, based on the KVL, no current flows through the diode D2 and the resistor R6, and the voltage at the node B is VCC. Therefore, VCC is the maximum reference voltage of the non-inverting input terminal of the operational amplifier U1A, and the maximum output voltage of the output terminal 120 of the rectifying filtering circuit 12 coupled to the secondary side of the transformer T1 may be set according to the maximum reference voltage.

(3) When the voltage drop between the two terminals of the resistor R7 reaches the threshold voltage of the three-terminal regulator U2, the three-terminal regulator U2 turns on. The voltage at the node A is pulled down to a low potential, the gate terminal of the field effect transistor Q1 is in a low potential, the field effect transistor Q1 turns off, and what is defined as stage three. Once the field effect transistor Q1 turns off, the voltage drop between the two terminals of the resistor R7 does not reach the threshold voltage of the three-terminal regulator U2, and the LED driving circuit 20 returns back to the stage two, and so repeatedly. Since the response speed of the three-terminal regulator U2 is fast enough, a steady voltage VDD (not shown in FIG. 2) (VDD<VCC) is formed at the node A, the voltage drop between the two terminals of the resistor R7 keeps at the threshold voltage of the three-terminal regulator U2. As a result, the current flowing through the resistor R7 is a constant current.

(4) When the steady voltage VDD is formed at the node A, the reference voltage of the non-inverting input terminal of the operational amplifier U1A, i.e., the voltage at the node B, falls in between VCC and VDD. Therefore, the output voltage of the output terminal 120 of the rectifying filtering circuit 12 coupled to the secondary side of the transformer T1 may be lower than the maximum output voltage thereof, and is directly proportional to the amount of the LEDs of the LED load 100. In particular, the less the amount of the LEDs, the lower the value of VDD as well as the output voltage. Accordingly, a single-group constant current output may be realized and the output voltage of the output terminal 120 of the rectifying filtering circuit 12 coupled to the secondary side of the transformer T1 varies with the load, the power loss is reduced as a result. In this exemplary embodiment, the voltage of the non-inverting input terminal of the operational amplifier U1A (i.e., the voltage at the node B) also varies with the conduction status of the LED load 100.

Figure 3:
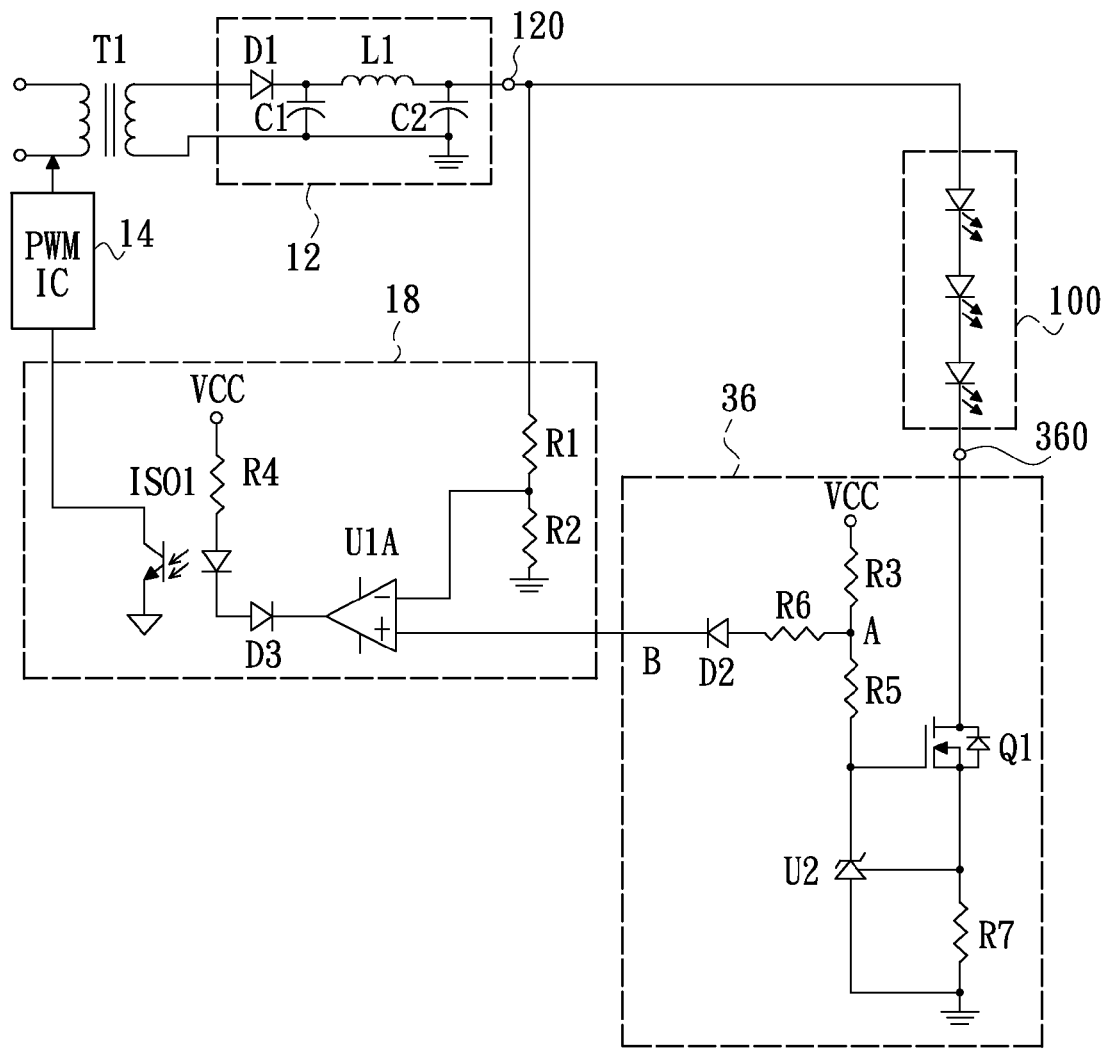
FIG. 3 is a schematic circuit diagram of a LED driving circuit in accordance with a third exemplary embodiment of the present invention.

Referring to FIG. 3, a LED driving circuit 30 in accordance with a third exemplary embodiment of the present invention is similar to the LED driving circuit 10 of the first exemplary embodiment, and what is difference is that the circuit structural configuration of a constant current circuit 36 of the LED driving circuit 30 is different from that of the constant current circuit 16 of the LED driving circuit 10 of the first exemplary embodiment.

In particular, the constant current circuit 36 includes a three-terminal regulator U2, a diode D2, a field effect transistor Q1 and resistors R3, R5, R6 and R7. The ground terminal of the three-terminal regulator U2 is electrically coupled to the ground potential, the input terminal of the three-terminal regulator U2 is electrically coupled to the ground terminal thereof through the resistor R7, and the output terminal of the three-terminal regulator U2 is adapted to receive the DC voltage VCC through the two series-connected resistors R3 and R5. The node formed between the two series-connected resistors R3 and R5 is defined as node A. The anode of the diode D2 is electrically coupled to the node A through the resistor R6, and the cathode of the diode D2 is electrically coupled to the non-inverting input terminal of the operational amplifier U1A of the feedback circuit 18. The node formed between the cathode of the diode D2 and the non-inverting input terminal of the operational amplifier U1A is defined as node B. The field effect transistor Q1 is electrically coupled between the output terminal 360 of the constant current circuit 36 and the input terminal of the three-terminal regulator U2, and the gate terminal of the field effect transistor Q1 is electrically coupled to the output terminal of the three-terminal regulator U2.

The operational principle of the LED driving circuit 30 is similar to that of the LED driving circuit 10 of the first exemplary embodiment, and thus may not be repeated herein.

Figure 4:
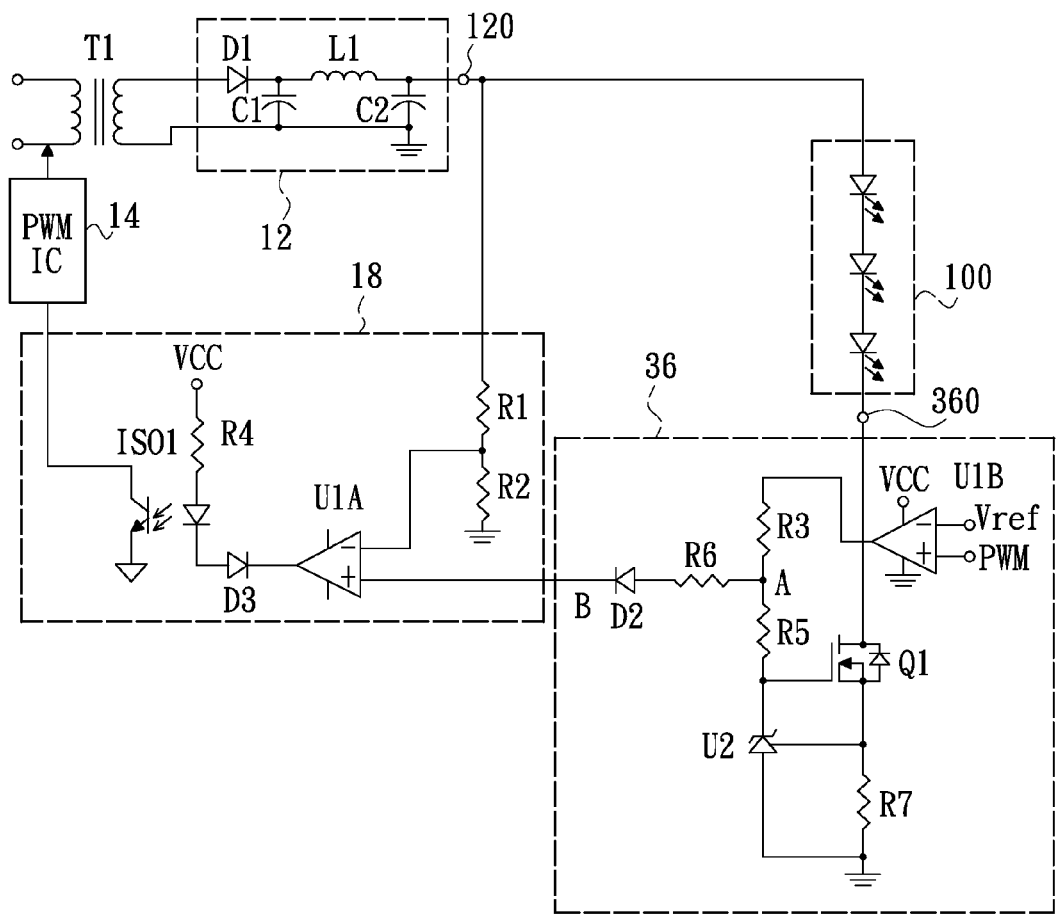
FIG. 4 is a schematic circuit diagram of a LED driving circuit in accordance with a fourth exemplary embodiment of the present invention.

Referring to FIG. 4, a LED driving circuit 40 in accordance with a fourth exemplary embodiment of the present invention is similar to the LED driving circuit 30 of the third exemplary embodiment, and what is difference is that the LED driving circuit 40 further includes an operational amplifier U1B to perform an external PWM dimming applied to the LED load 100. Correspondingly, the output terminal of the three-terminal regulator U2 is electrically coupled to the operational amplifier U1B through the two series-connected resistors R3 and R5, rather than directly receive the DC voltage VCC through the two series-connected resistors R3 and R5 as shown in FIG. 3. More specifically, the power terminal of the operational amplifier U1B receives the DC voltage VCC, the ground terminal thereof is electrically coupled to the ground potential, the inverting input terminal thereof receives a reference voltage Vref, the non-inverting input terminal thereof receives a pulse width modulation signal PWM, and the output terminal thereof is configured for outputting a DC voltage to the output terminal of the three-terminal regulator U2 through the two series-connected resistors R3 and R5.

An operational principle of the LED driving circuit 40 is similar to that of the LED driving circuit 20 of the third exemplary embodiment, and thus may not be repeated herein.

Figure 5:
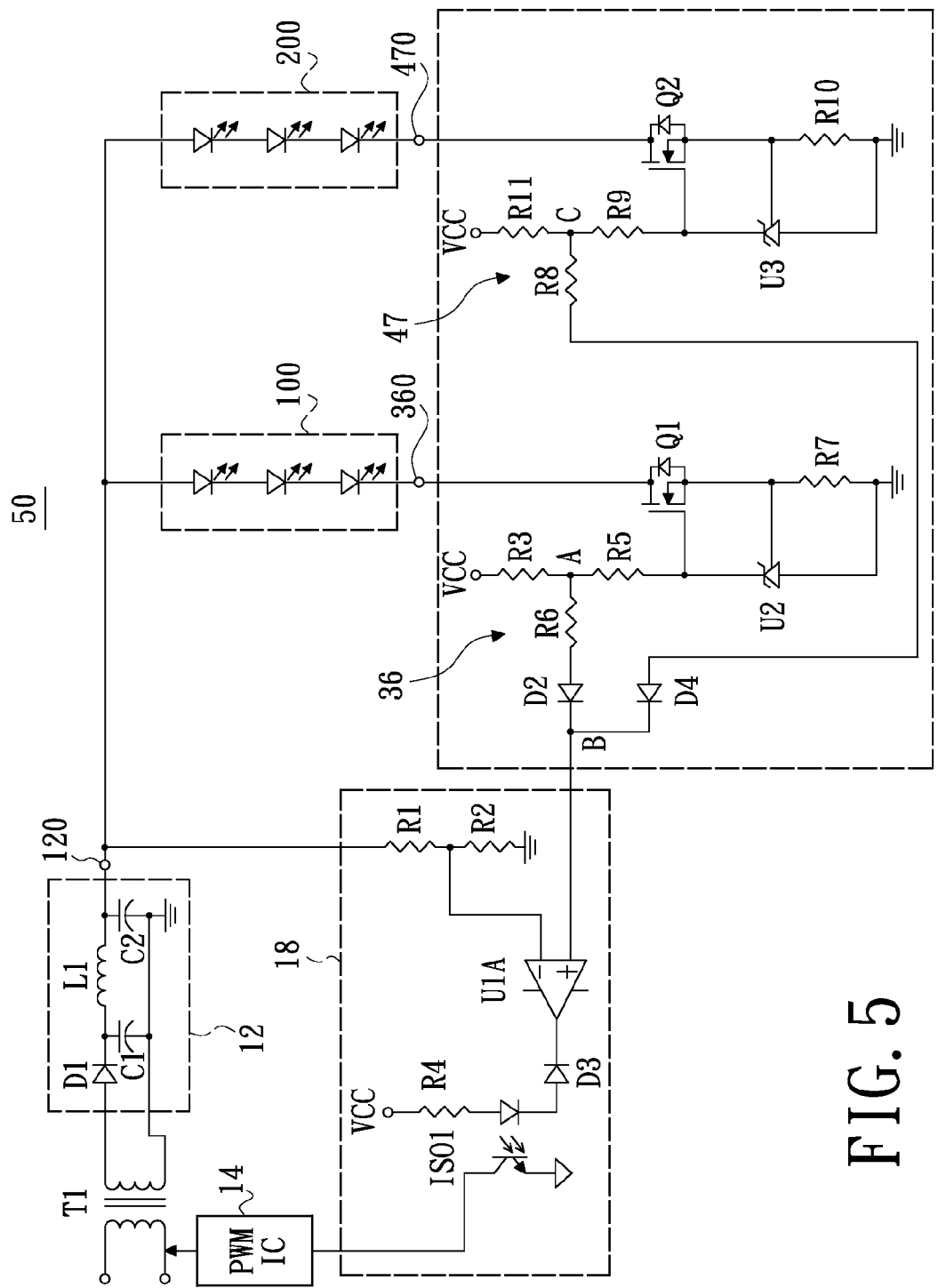
FIG. 5 is a schematic circuit diagram of a LED driving circuit in accordance with a fifth exemplary embodiment of the present invention.

Referring to FIG. 5, a LED driving circuit 50 in accordance with a fifth exemplary embodiment of the present invention is adapted to drive a plurality of LED load 100, 200 connected in parallel. The LED driving circuit 50 is similar to the LED driving circuit 30 of the third exemplary embodiment, and what is difference is that the LED driving circuit 50 further includes another constant current circuit 47.

The constant current circuit 47 and the constant current circuit 36 have similar circuit structural configurations. In particular, the constant current circuit 47 includes a three-terminal regulator U3, a diode D4, a field effect transistor Q2 and resistors R8, R9, R10 and R11. The ground terminal of the three-terminal regulator U3 is electrically coupled to the ground potential, the input terminal of the three-terminal regulator U3 is electrically coupled to the ground terminal thereof through the resistor R10, and the output terminal of the three-terminal regulator U3 is adapted to receive the DC voltage VCC through the two series-connected resistors R9 and R11. The node formed between the resistors R9 and R11 is defined as node C. The anode of the diode D4 is electrically coupled to the node C through the resistor R8, and the cathode of the diode D4 is electrically coupled to the non-inverting input terminal of the operational amplifier U1A of the feedback circuit 18. The field effect transistor Q2 is electrically coupled between an output terminal 470 of the constant current circuit 47 and the input terminal of the three-terminal regulator U3, and the gate terminal of the field effect transistor Q2 is electrically coupled to the output terminal of the three-terminal regulator U3. The LED load 200 is adapted to be electrically coupled between the output terminal 120 of the rectifying filtering circuit 12 and the output terminal 470 of the constant current circuit 47.

In this exemplary embodiment, the LED driving circuit 50 may produce two constant current outputs, an operational principle thereof is similar to the operational principle of the LED driving circuit 30 of the third exemplary embodiment and thus may not be repeated herein. However, when the LED driving circuit 50 is applied to the plurality of LED loads 100, 200 connected in parallel, differences of the forward threshold voltages of the LEDs ought to be taken in consideration. That is, different driving voltages would be required in order to obtain a same current for the LED loads have the same amount of LEDs. Therefore, in the application of the plurality of LED loads 100, 200 connected in parallel, a maximum driving voltage is taken to drive each of the LED loads 100, 200 connected in parallel. Otherwise, some of the LEDs would have a low brightness because of the insufficient driving voltage.

The output voltage of the output terminal 120 of the rectifying filtering circuit 12 of the LED driving circuit 50 still is determined by the voltage of the non-inverting input terminal of the operational amplifier U1A (i.e., the voltage at the node B). The higher the voltage at the node B, the higher the output voltage of the output terminal 120 of the rectifying filtering circuit 12 coupled to the secondary side of the transformer T1. As shown in FIG. 5, the voltages at the node A and the node C are directly proportional to the driving voltages required by the LED loads 100, 200 respectively. That is, if the driving voltage required by the LED load 100 is higher than the driving voltage required by the LED load 200, the voltage at the node A is higher than the voltage at the node C. Therefore, the voltage at the node B is determined by the voltage at the node A, and the output terminal 120 of the rectifying filtering circuit 12 may output the required driving voltage.

Figure 6:
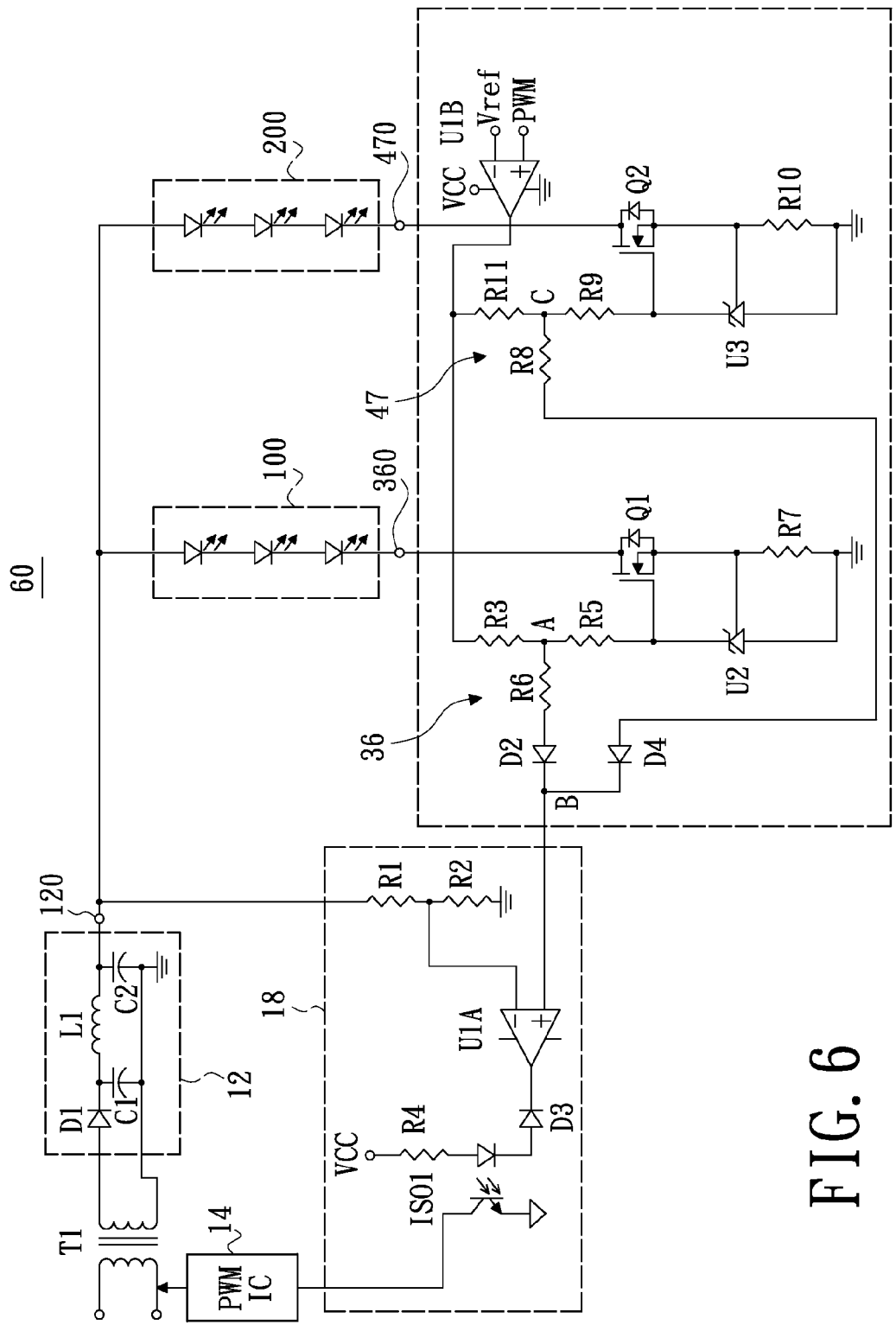
FIG. 6 is a schematic circuit diagram of a LED driving circuit in accordance with a sixth exemplary embodiment of the present invention.
Figure 7:
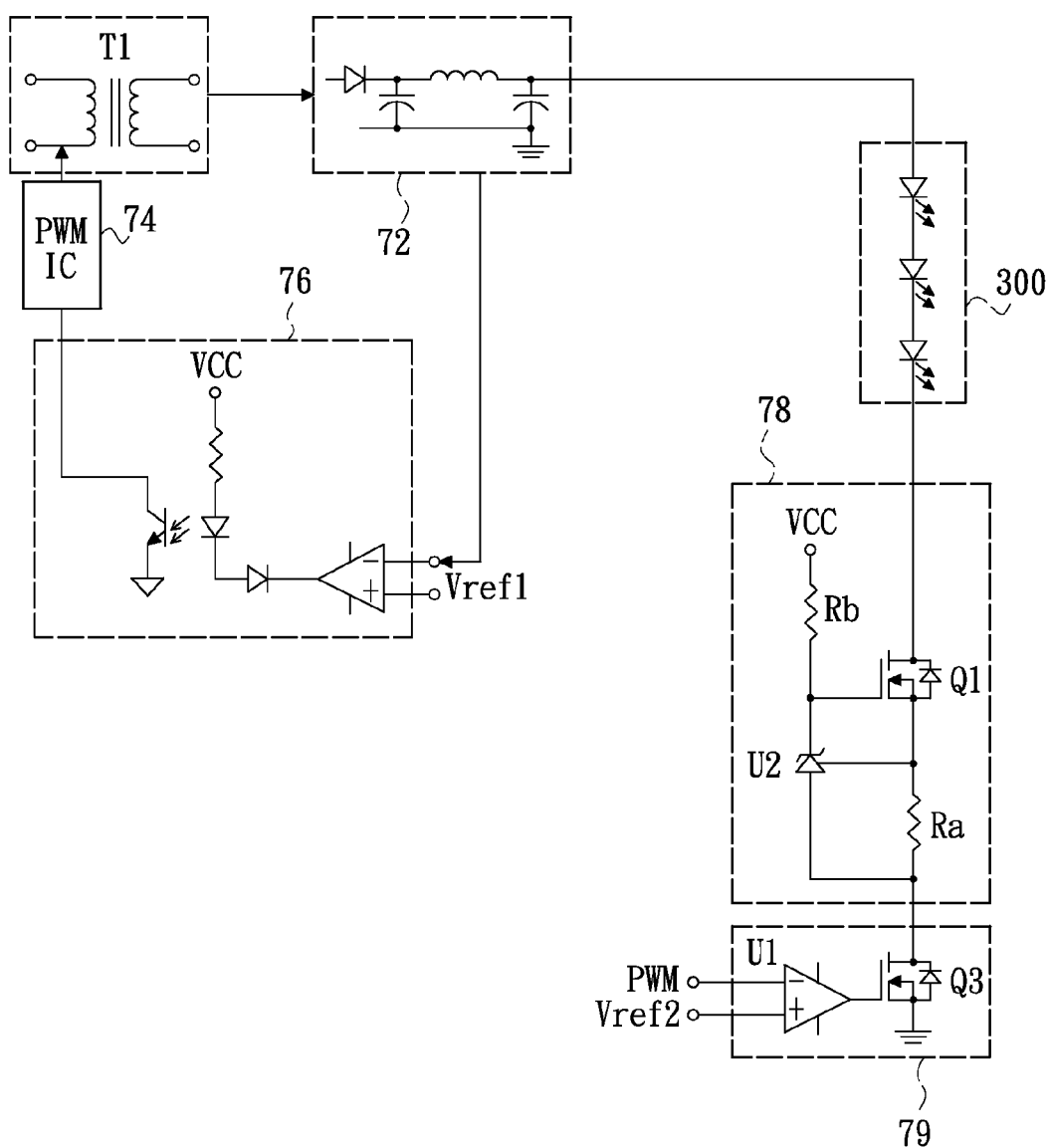
FIG. 7 is a schematic circuit diagram of a conventional LED driving circuit.

Referring to FIG. 6, a LED driving circuit 60 in accordance with a sixth exemplary embodiment of the present invention is similar to the LED driving circuit 50 of the fifth exemplary embodiment, and what is difference is that the LED driving circuit 60 further includes an operational amplifier U1B to perform an external PWM dimming applied to the LED loads 100, 200. Correspondingly, the output terminal of the three-terminal regulator U2 is electrically coupled to the operational amplifier U1B through the two series-connected resistors R3 and R5, rather than directly receive the DC voltage VCC as shown in FIG. 5. The output terminal of the three-terminal regulator U3 is electrically coupled to the operational amplifier U1B through the two series-connected resistors R9 and R11, rather than directly receive the DC voltage VCC as shown in FIG. 5. More specifically, the power terminal of the operational amplifier U1B receives the DC voltage VCC, the ground terminal thereof is electrically coupled to the ground potential, the inverting input terminal thereof receives a reference voltage Vref, the non-inverting input terminal thereof receives a pulse width modulation signal PWM, and the output terminal thereof is configured for outputting the DC voltage to the output terminal of the three-terminal regulator U2 and the output terminal of the three-terminal regulator U3 respectively through the two series-connected resistors R3 and R5 and the two series-connected resistors R9 and R11.

An operational principle of the LED driving circuit 60 is similar to that of the LED driving circuit 20 of the third exemplary embodiment and the LED driving circuit 50 of the fifth exemplary embodiment, and thus may not be repeated herein.

In summary, in the various embodiments of the present invention, the constant current circuit(s) is/are electrically coupled to an input terminal of the feedback circuit for supplying a reference voltage varied with the conduction status of the LED load to the input terminal. Therefore, a single constant current output or multiple constant current outputs may be achieved and the output voltage of the rectifying filtering circuit coupled to the secondary side of the transformer varies with the LED load, the power loss is reduced as a result. Furthermore, when there is a need to perform an external PWM dimming applied to the LED load(s), no additional field effect transistor is needed as required in the prior art, therefore the cost is also reduced.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations may be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light emitting diode driving circuit configured to drive a light emitting diode load, comprising:
a transformer having a primary side and a secondary side;

a rectifying filtering circuit electrically coupled to the secondary side and having a first output terminal;
a pulse width modulation integrated circuit electrically coupled to the primary side;
a constant current circuit having a second output terminal, wherein the light emitting diode load is electrically coupled between the first output terminal and the second output terminal; and
a feedback circuit having a first input terminal and a second input terminal, wherein the first input terminal is electrically coupled to the first output terminal to receive a first voltage, the second input terminal is electrically coupled to the constant current circuit to receive a second voltage, the second voltage varies a conduction status of the light emitting diode load, and the feedback circuit is configured to control the pulse width modulation integrated circuit according to the first voltage and the second voltage.

2. The light emitting diode driving circuit as claimed in claim 1, wherein the constant current circuit comprises a three-terminal regulator, a diode, a field effect transistor, a first resistor, a second resistor, a third resistor, and a fourth resistor, a ground terminal of the three-terminal regulator is grounded, an input terminal of the three-terminal regulator is electrically coupled to the ground terminal through the fourth resistor, an output terminal of the three-terminal regulator is configured to receive a third voltage through the second resistor, an anode of the diode is electrically coupled to the second input terminal and configured to receive a fourth voltage through the first resistor, a cathode of the diode is electrically coupled to the output terminal of the three-terminal regulator through the third resistor, the field effect transistor is electrically coupled between the input terminal of the three-terminal regulator and the second output terminal, and a gate terminal of the field effect transistor is electrically coupled to the output terminal of the three-terminal regulator.

3. The light emitting diode driving circuit as claimed in claim 2, wherein the third voltage and the fourth voltage are equal to each other.

4. The light emitting diode driving circuit as claimed in claim 2, wherein the third voltage is outputted by an operational amplifier, the operational amplifier has a third input terminal and a fourth input terminal, the third input terminal is configured to receive a reference voltage, and the fourth input terminal is configured to receive a pulse width modulation signal.

5. The light emitting diode driving circuit as claimed in claim 1, wherein the constant current circuit comprises a three-terminal regulator, a diode, a field effect transistor, a first resistor, a second resistor, a third resistor, and a fourth resistor, a ground terminal of the three-terminal regulator is grounded, an input terminal of the three-terminal regulator is electrically coupled to the ground terminal through the fourth resistor, an output terminal of the three-terminal regulator is configured to receive a third voltage through the first resistor and the second resistor connected in series, a cathode of the diode is electrically coupled to the second input terminal, an anode of the diode is electrically coupled to a node formed between the first resistor and the second resistor through the third resistor, the field effect transistor is electrically coupled between the input terminal of the three-terminal regulator and the second output terminal, and a gate terminal of the field effect transistor is electrically coupled to the output terminal of the three-terminal regulator.

6. The light emitting diode driving circuit as claimed in claim 5, wherein the third voltage is outputted by an operational amplifier, the operational amplifier has a third input terminal and a fourth input terminal, the third input terminal is configured to receive a reference voltage, and the fourth input terminal is configured to receive a pulse width modulation signal.

7. A light emitting diode driving circuit configured to drive a plurality of light emitting diode loads connected in parallel, comprising:
a transformer having a primary side and a secondary side;
a rectifying filtering circuit electrically coupled to the secondary side and having a first output terminal;
a pulse width modulation integrated circuit electrically coupled to the primary side;
a plurality of constant current circuits each having a second output terminal, wherein the light emitting diode loads are respectively electrically coupled between the first output terminal and the second output terminals; and
a feedback circuit having a first input terminal and a second input terminal, wherein the first input terminal is electrically coupled to the first output terminal to receive a first voltage, the second input terminal is electrically coupled to the plurality of constant current circuits to receive a second voltage provided by one of the plurality of constant current circuits, the second voltage varies a conduction status of the light emitting diode load electrically coupled to the particular constant current circuit, and the feedback circuit is configured to control the pulse width modulation integrated circuit according to the first voltage and the second voltage.

8. The light emitting diode driving circuit as claimed in claim 7, wherein each of the constant current circuits comprises a three-terminal regulator, a diode, a field effect transistor, a first resistor, a second resistor, a third resistor, and a fourth resistor, a ground terminal of the three-terminal regulator is grounded, an input terminal of the three-terminal regulator is electrically coupled to the ground terminal through the fourth resistor, an output terminal of the three-terminal regulator is configured to receive a third voltage through the first resistor and the second resistor connected in series, a cathode of the diode is electrically coupled to the second input terminal, an anode of the diode is electrically coupled to a node formed between the first resistor and the second resistor through the third resistor, the field effect transistor is electrically coupled between the input terminal of the three-terminal regulator and the second output terminal, and a gate terminal of the field effect transistor is electrically coupled to the output terminal of the three-terminal regulator.

9. The light emitting diode driving circuit as claimed in claim 8, wherein the third voltage is outputted by an operational amplifier, the operational amplifier has a third input terminal and a fourth input terminal, the third input terminal is configured to receive a reference voltage, and the fourth input terminal is configured to receive a pulse width modulation signal.

* * * * *